United States Patent [19]
Udagawa et al.

[11] Patent Number: 5,880,781
[45] Date of Patent: Mar. 9, 1999

[54] COLOR FILTER ARRAY FOR A CCD DRIVEN IN EIGHT PHASES

[75] Inventors: Yoshiro Udagawa, Miyashiro-machi; Akira Suga, Tokyo; Toshikazu Yanai, Kawasaki; Masato Ikeda, Kurume, all of Japan

[73] Assignee: Canon Kabushiki Kaisha, Tokyo, Japan

[21] Appl. No.: 688,667

[22] Filed: Jul. 29, 1996

[30] Foreign Application Priority Data

Jul. 31, 1995 [JP] Japan .................................. 7-194965

[51] Int. Cl.$^6$ ............................ H04N 3/14; H04N 5/335; H04N 9/083
[52] U.S. Cl. .............................................................. 348/279
[58] Field of Search .................................... 348/272, 273, 348/277, 279, 280

[56] References Cited

U.S. PATENT DOCUMENTS

| | | | |
|---|---|---|---|
| 4,647,978 | 3/1987 | Kinoshita et al. | 348/514 |
| 4,733,302 | 3/1988 | Kinoshita et al. | 348/314 |
| 5,043,821 | 8/1991 | Suga et al. | 348/320 |
| 5,132,803 | 7/1992 | Suga et al. | 348/315 |
| 5,267,028 | 11/1993 | Suga et al. | 348/223 |
| 5,323,233 | 6/1994 | Yamagami et al. | 348/277 |
| 5,568,193 | 10/1996 | Kawahara | 348/279 |
| 5,581,298 | 12/1996 | Sasaki | 348/279 |
| 5,614,947 | 3/1997 | Tanizoe | 348/279 |

FOREIGN PATENT DOCUMENTS

| | | |
|---|---|---|
| 0485221 | 5/1992 | European Pat. Off. . |
| 0630151 | 12/1994 | European Pat. Off. . |
| 07230387 | 7/1996 | European Pat. Off. . |

Primary Examiner—Bryan Tung
Attorney, Agent, or Firm—Fitzpatrick, Cella, Harper & Scinto

[57] ABSTRACT

In order to attain a high-speed thin-out reading operation and to obtain high image quality in an image pickup apparatus, a color filter array of this invention is applied to an interline CCD (image pickup element) in which a vertical CCD is driven in eight phases). The high-speed thin-out reading operation is performed as follows. That is, photoelectrically converted carriers for two horizontal lines are transferred to the vertical CCD every third lines (e.g., C in the first line and M in the second line, C in the fifth line and G in the sixth line, . . . are transferred to the vertical CCD), and residual photoelectrically converted carriers (the Y carrier in the third line, the G carrier in the fourth line, the Y carrier in the seventh line, and the M carrier in the eighth line) are discharged by a substrate discharge operation. Thereafter, the photoelectrically converted carriers in the vertical CCD are sequentially transferred in the vertical CCD, and are output via a horizontal CCD and an output amplifier. Chrominance signal carriers on the 1/2PH axis generated by the color filter array of this invention can be removed by an optical LPF, thus obtaining high image quality.

5 Claims, 12 Drawing Sheets

FIG.1

|   | 1 | 2 | 3 |
|---|---|---|---|
| 1 | C | Y | C |
| 2 | M | G | M |
| 3 | Y | C | Y |
| 4 | G | M | G |
| 5 | C | Y | C |
| 6 | G | M | G |
| 7 | Y | C | Y |
| 8 | M | G | M |
|   | C | Y | C |

FIG.9A
PRIOR ART
FIG.9B
PRIOR ART
FIG.9C
PRIOR ART
FIG.9D
PRIOR ART
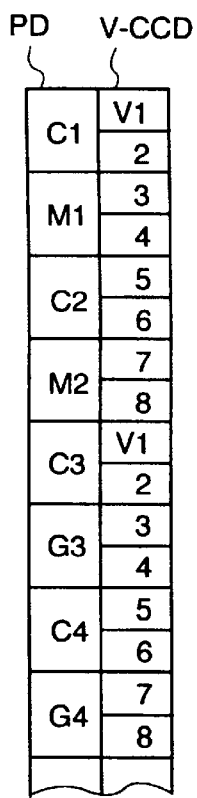
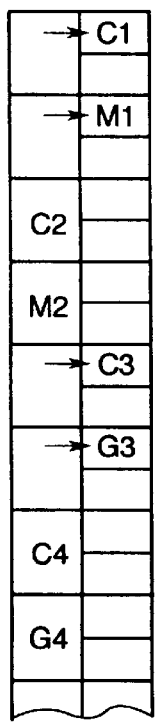
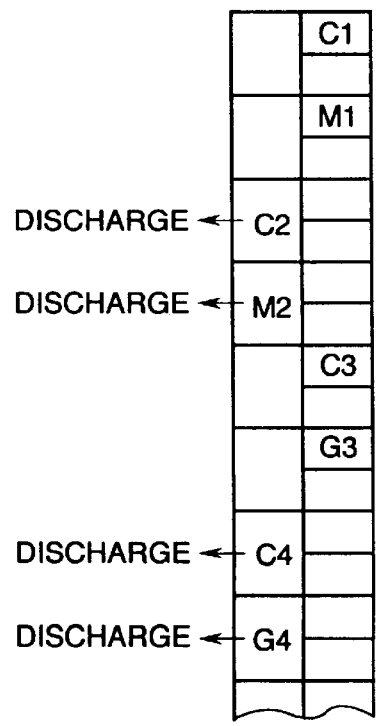
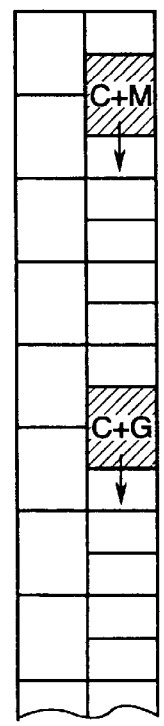

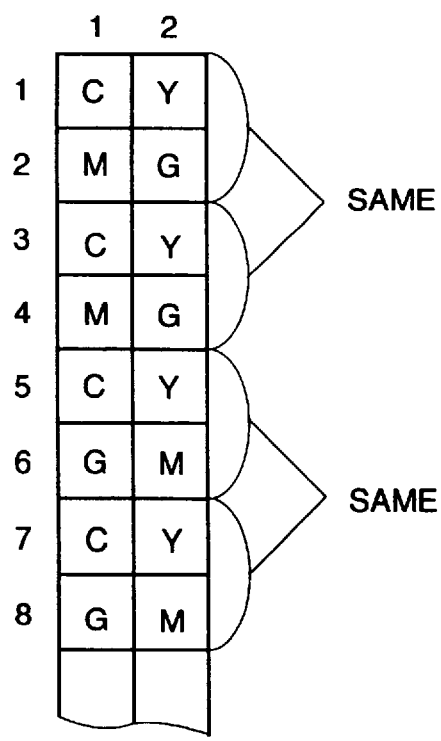

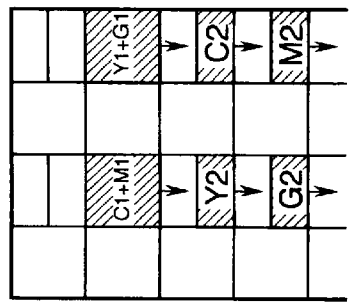
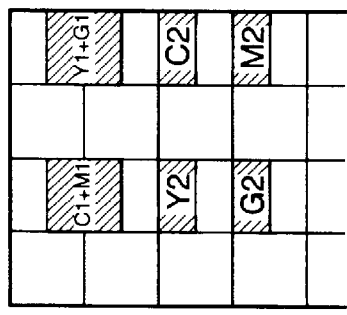
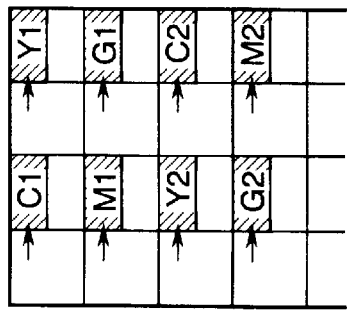
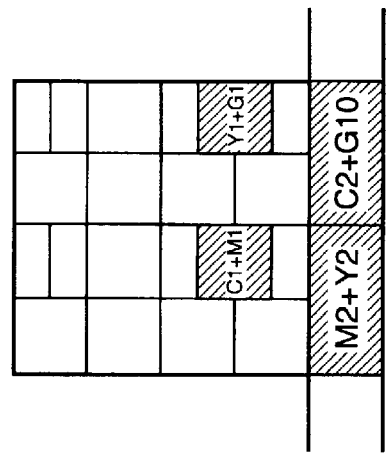
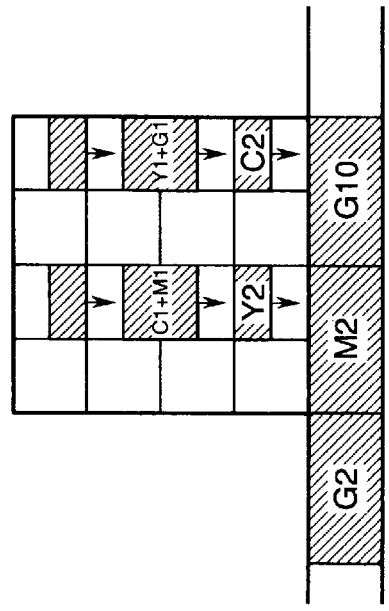
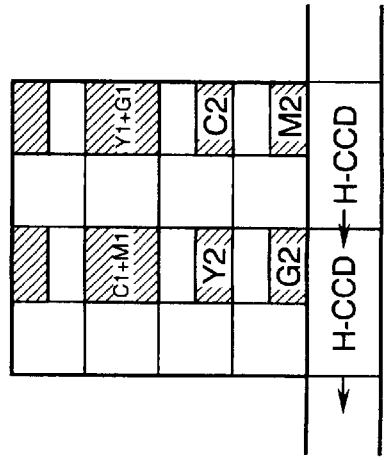

COLOR FILTER ARRAY FOR A CCD DRIVEN IN EIGHT PHASES

BACKGROUND OF THE INVENTION

1. Field of the Invention

The present invention relates to an image pickup apparatus consisting of a single solid-state image pickup element for picking up an image via a color filter array, i.e., a single-plate color image pickup apparatus.

2. Related Background Art

As a conventional single-plate type color filter array, a so-called complementary mosaic type color filter array is popularly used and known in, e.g., video cameras. FIG. 7 shows an example of the color layout of this color filter array. This color layout has the following features. That is, the color layout shown in FIG. 7 matches well a so-called field reading method, and even when a sum of two pixels in the vertical direction is read out (in this case, such combinations of pixels are interlaced in units of fields), a relatively broad luminance signal range can be assured. In addition, since the complementary type color filter array is used, the sensitivity is high.

Such color filter array is normally applied to an interline CCD shown in FIG. 6. The interline CCD shown in FIG. 6 comprises photodiodes PD constituting pixels, vertical CCD shift registers V-CCD, and a horizontal CCD shift register H-CCD. Charge signals on desired photodiodes PD are simultaneously read out to the vertical CCD shift registers during a vertical blanking period. Thereafter, the readout charge signals are sequentially transferred inside the vertical CCD shift registers, and are output via the horizontal CCD shift register H-CCD and an output amplifier.

In recent years, multi-pixel CCDs (image pickup elements) have been developed. In particular, CCDs having pixels (1.5 to 2 million pixels) are available. In such situation, the layout of the complementary mosaic type color filter array suffers some problems.

More specifically, the problems are associated with a high-speed reading operation and a thin-out reading operation. When a multi-pixel sensor having, e.g., 1.6 million pixels is to be realized by an interline CCD shown in FIG. 6, if it is manufactured without using any special processes for the vertical and horizontal CCD shift registers, the time required for reading out all pixels is 1/15 sec about four times that (1/60 sec) in the field reading mode of an interline CCD having 0.4 million pixels. This means that a photometric operation (auto-focus (AF), auto-exposure (AE), and auto-white balance (AWB)) prior to a photographing operation of a so-called TTL (Through the lens) system requires much time. When such sensor is applied to a still video camera, or the like, the time required from the depression of the shutter until the start of main exposure is prolonged, and the user may lose a good shutter chance.

In view of this problem, a thin-out reading operation is performed using a substrate discharge operation popularly adopted in an interline CCD, thus shortening the reading time. This operation will be described below with reference to FIGS. 8A to 8C. Photoelectrically converted carriers are generated on photodiodes (to be abbreviated as PDs hereinafter) (FIG. 8A), and gates V1 (also serving as transfer gates) of a vertical CCD shift register (to be abbreviated as V-CCD hereinafter) are enabled to transfer C signal carriers to the gates V1 (FIG. 8B). A voltage is applied to a substrate to discharge M and G signal carriers in the substrate direction (FIG. 8C). Thereafter, the V-CCD is normally driven to transfer and output the carriers.

However, in this case, although a thin-out operation can be attained, the C signal carriers in FIG. 8C cannot be transferred by mixing (i.e., by decreasing the number of data), the transfer time still requires 1/15 sec upon field reading. In addition, since only the C and Y signal carriers of a chrominance signal are output, the output signal cannot be used in AWB control.

In order to solve this problem, a color filter array which has an 8-phase V-CCD, as shown in FIG. 9A and can form a chrominance signal even when a thin-out operation is performed is proposed. This color filter array will be described below with reference to the accompanying drawings. Photoelectrically converted carriers are generated in PDs (FIG. 9A). The color layout has a basic repetitive pattern constituted by 2×8 pixels, and the same pixel patterns appear every third lines in the vertical direction, as shown in FIG. 10, so that a chrominance signal can be generated even when a thin-out operation is performed later. Gates V1 and V3 are enabled to transfer C1, M1, C3, and G3 signal carriers to a V-CCD (FIG. 9B). A voltage is applied to the substrate to discharge C2, M2, C4, and G4 carriers (FIG. 9C). The potential of the V-CCD then lowers, C1 and M1 carriers and C3 and G3 carriers add up each other in the V-CCD to obtain C+M and C+G signal carriers, and these carriers are transferred (FIG. 9D).

According to this method, the number of carriers to be transferred can be halved (i.e., 1/30 sec). In addition, a chrominance signal can be output.

However, the image quality suffers when all the pixels are read out. In FIG. 11, the sampling carriers of luminance and chrominance signals in the color layout shown in FIG. 10 are plotted on the two-dimensional frequency plane. Note that 1/PH is the sampling frequency determined by the pixel interval in the horizontal direction, and 1/PV is the sampling frequency determined by the pixel interval in the horizontal direction. As can be seen from FIG. 11, the number of chrominance signal carriers on the 1/2PH axis is larger than that in the color layout of a complementary mosaic type filter array using a normal 2×4 pixel repetitive pattern, as shown in FIG. 12, and the amount of color moire increases as a whole. For this reason, when chrominance signal carriers are to be suppressed by, e.g., an optical LPF, an optical LPF having stronger cutoff characteristics is required, resulting in low resolution (especially in the horizontal direction).

As described above, in the above-mentioned prior art, when the color layout of the color filter array is changed to attain a high-speed thin-out reading operation, the image quality deteriorates upon reading out all pixels. Therefore, a thin-out reading operation that places an importance on image quality cannot be realized.

SUMMARY OF THE INVENTION

The present invention has been made to solve the above-mentioned problems and has as its object to provide an image pickup apparatus which can simultaneously attain a high-speed thin-out reading operation and high-image quality.

In order to achieve the above object, according to the present invention, an image pickup apparatus has an arrangement as described in (1), (2), and (3) below.

(1) In an image pickup apparatus comprising a color filter array and a solid-state image pickup element for picking up an image of an object via the color filter array, the color filter array comprises a first horizontal line in which color filters in first and second colors are sequentially and repetitively arranged in a horizontal direction, a second horizontal line in which color filters in third and fourth colors are sequentially and repetitively arranged in the horizontal direction, a third horizontal line in which color filters in the second and first colors are sequentially and repetitively arranged in the horizontal direction, a fourth horizontal line in which color filters in the fourth and third colors are sequentially and repetitively arranged in the horizontal direction, a fifth horizontal line having the same color filter layout as the first horizontal line, a sixth horizontal line having the same color filter layout as the fourth horizontal line, a seventh horizontal line having the same color filter layout as the third horizontal line, an eighth horizontal line having the same color filter layout as the second horizontal line, and ninth and subsequent horizontal lines that repeat the same color filter layouts as the first to eighth horizontal lines.

(2) In an image pickup apparatus described in (1), the solid-state image pickup element comprises an interline CCD in which a vertical CCD is driven in eight phases, and which comprises driving means of the solid-state image pickup element, which element has a driving mode of transferring photoelectrically converted carriers for two horizontal lines to the vertical CCD every third lines, discharging unnecessary charges by performing a substrate discharge operation, sequentially transferring the photoelectrically converted carriers inside the vertical CCD, and outputting the photoelectrically converted carriers via a horizontal CCD and an output amplifier.

(3) In an image pickup apparatus described in (1) or (2), the color filter in the first color is a filter for shielding red light, the color filter in the second color is a filter for shielding blue light, the color filter in the third color is a filter for shielding green light, and the color filter in the fourth color is a filter for transmitting the green light.

The above and other objects and features of the present invention will become apparent from the following specification and the accompanying drawings.

BRIEF DESCRIPTION OF THE DRAWINGS

FIG. 1 is a view showing the color layout of a color filter array used in the first embodiment of the present invention;

FIGS. 9A to 9D are views showing an example of the transfer operation of pixel signals in a CCD in a modification of the color layout shown in FIG. 7;

FIG. 10 is a view showing the modification of the color layout shown in FIG. 7;

FIGS. 13A to 13G are views showing an example of the transfer operation of signal charges in a CCD.

DETAILED DESCRIPTION OF THE PREFERRED EMBODIMENTS

The present invention can be practiced in the form of, e.g., a still video camera (also called an electronic still camera), a movie video camera, and the like.

The preferred embodiment of the present invention will be described in detail below.

FIG. 1 shows the color layout (also called a pattern) of a color filter array used in a "still video camera" according to the first embodiment of the present invention. This color layout basically includes four colors, i.e., C (cyan: shields red light), Y (yellow: shields blue light), M (magenta: shields green light), and G (green: transmits green light) in a predetermined pattern. In odd lines constituted by repetitive patterns of Cs and Ys, Cs and Ys in a given odd line replace each other in the next odd line, and replace each other back again in the second next odd line. On the other hand, in even lines constituted by repetitive pattern of Gs and Ms, Gs and Ms in a given even line replace each other in the next even line, remain replaced in the second next even line, and replace each other back in the third next even line. That is, Gs and Ms replace each other every fifth lines (every third even lines).

The operation when a thin-out reading operation is performed in a CCD using such color filter array will be described below with reference to FIGS. 2A to 2D. The CCD is an interline CCD having an 8-phase V-CCD.

Figure 2A:
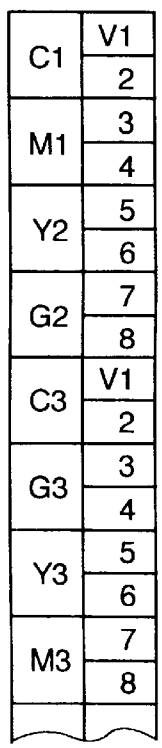
FIGS. 2A to 2D are explanatory views of the transfer operation of pixel signals in a CCD in the first embodiment.
Figure 2B:
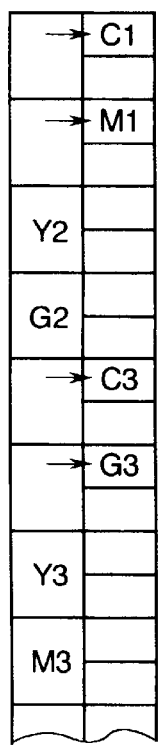
Figure 2C:
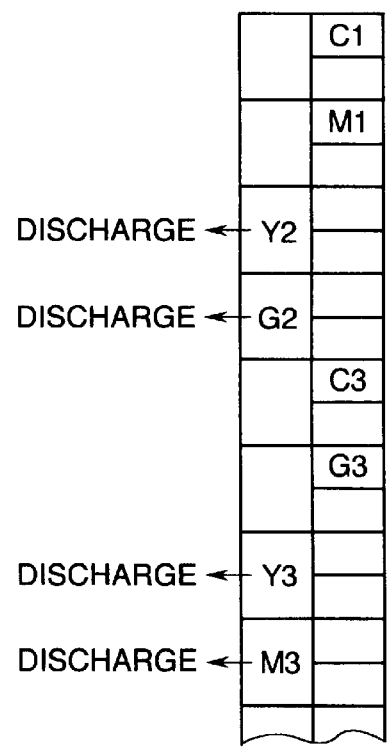
Figure 2D:
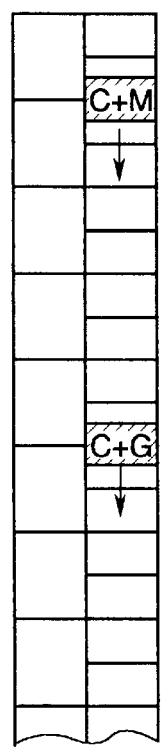

Photoelectrically converted carriers are accumulated on PDs (FIG. 2A). Gates V1 and V3 are enabled to transfer C1, M1, C3, and G3 carriers to the V-CCD (FIG. 2B). A voltage is applied to the substrate, and Y2, G2, Y3, and M3 carriers are discharged to the substrate (FIG. 2C). The potential of the V-CCD lowers to add C1 and M1 carriers, and C3 and G3 carriers to each other, and the sum carriers are transferred (FIG. 2D).

As described above, according to this embodiment, a high-speed thin-out reading operation can be realized for a time period half that required in the conventional apparatus.

Figure 3:
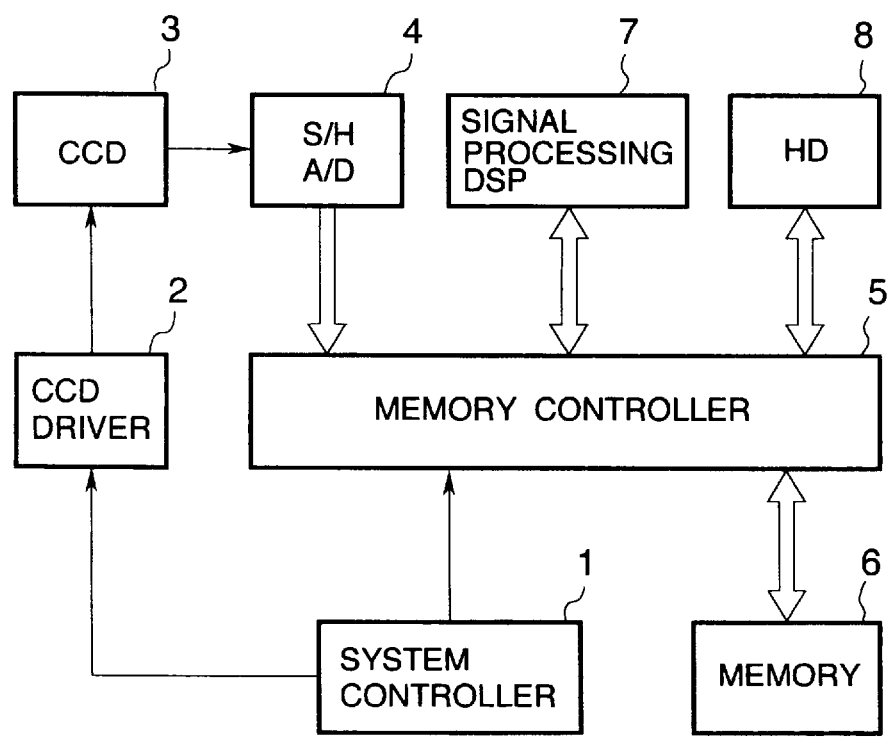
FIG. 3 is a block diagram showing the arrangement of the first embodiment.

FIG. 3 shows the arrangement of the still video camera of this embodiment, which comprises the above-mentioned CCD.

When the first stroke switch (SW1) of the shutter button (not shown) is turned on, a photometric operation (AF, AE, and AWB control operations) is started. A system controller 1 issues a command for starting a thin-out driving operation to a CCD driver 2, and a CCD 3 is set in a thin-out driving mode including the above-mentioned substrate discharge operation. Then, a signal is output at high speed, and is converted into a digital signal via an S/H & A/D (sampling/hold & analog-to-digital conversion) unit 4. The digital signal is stored in a memory 6 via a memory controller 5. The system controller 1 fetches and calculates optimal data to AF, AE, and AWB control operations from the stored data, and sets parameters for a lens, a stop, a signal processing DSP 7, and the like on the basis of the calculated data. When the second stroke switch (SW2) of the shutter button is turned on, a main exposure operation is started. The system controller 1 switches the driving mode of the CCD driver 2 to a normal driving mode to drive the CCD 3 so as to output a main exposure signal. The output signal is converted into a digital signal via the S/H & A/D unit 4, and the digital signal is stored in the memory 6 via the memory controller 5. The stored signal is subjected to signal processing (processing so-called setup, aperture, color conversion, and the like) using the signal processing DSP 7 to be converted into an image file, and the image file is written in a hard disk (HD) 8 as data.

Figure 4:
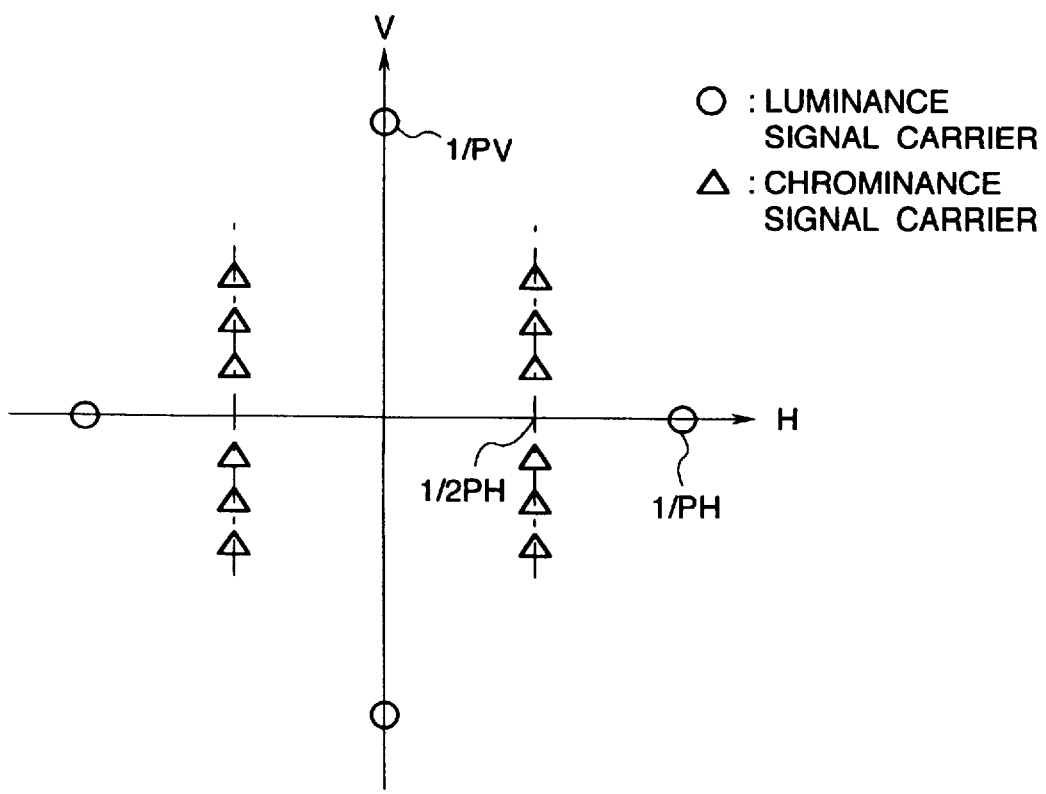
FIG. 4 is a graph showing the sampling carrier positions in the color layout shown in FIG. 1.
Figure 11:
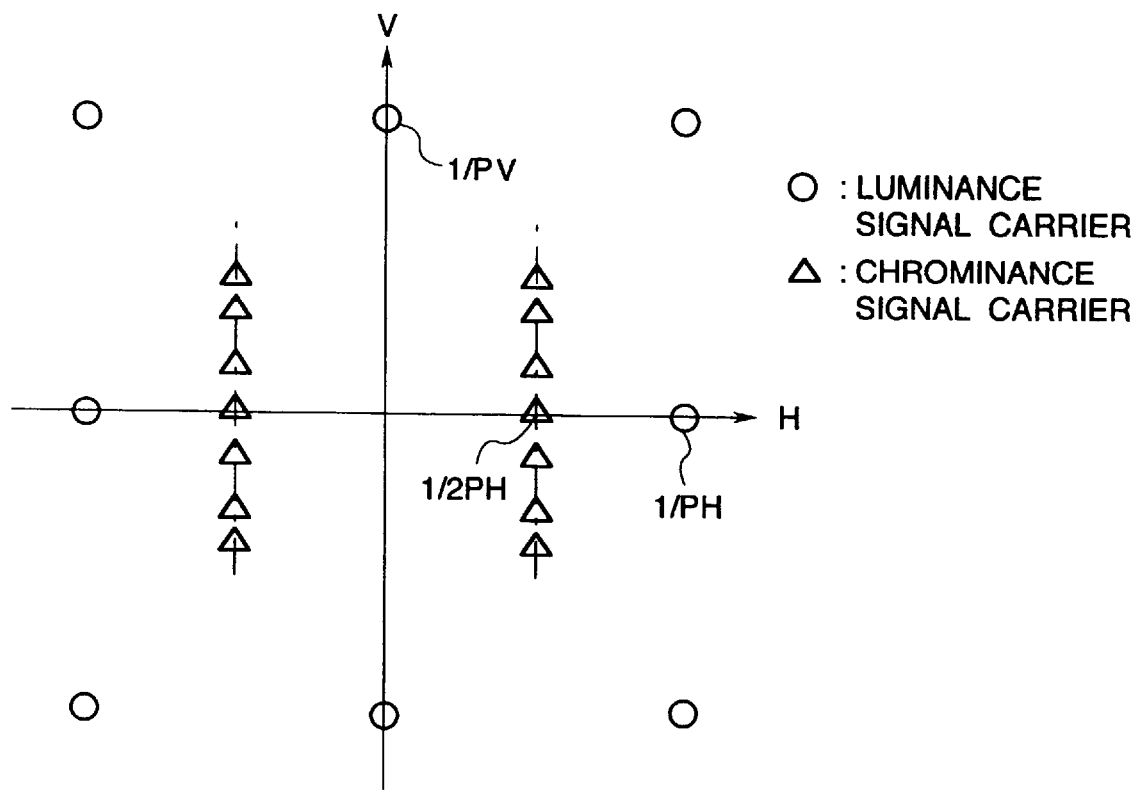
FIG. 11 is a graph showing the sampling carrier positions in the color layout shown in FIG. 10.
Figure 12:
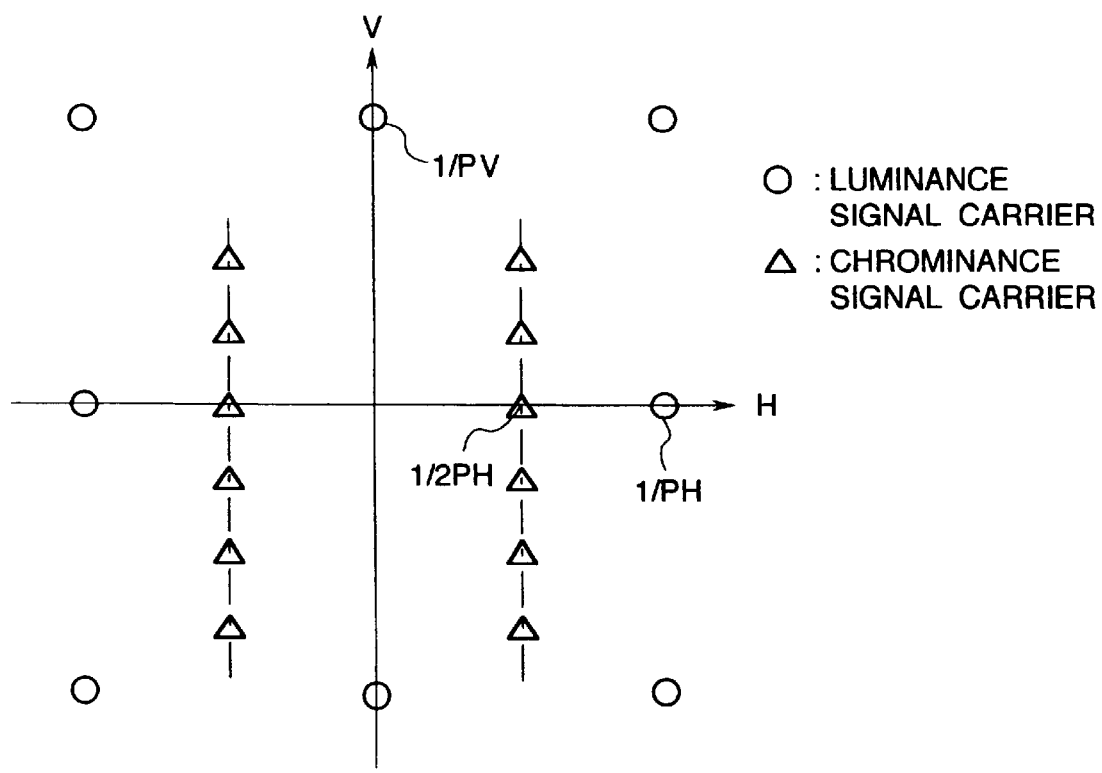
FIG. 12 is a graph showing the sampling carrier positions in the color layout shown in FIG. 7.

FIG. 4 shows the state of sampling carriers in this embodiment using the color filter array shown in FIG. 1. The number of chrominance signal carriers on the 1/2PH axis is smaller than that in FIG. 11. In particular, the remarkable feature of this embodiment is that the chrominance signal carrier on the horizontal axis (1/2PH, 0) has disappeared.

Figure 5:
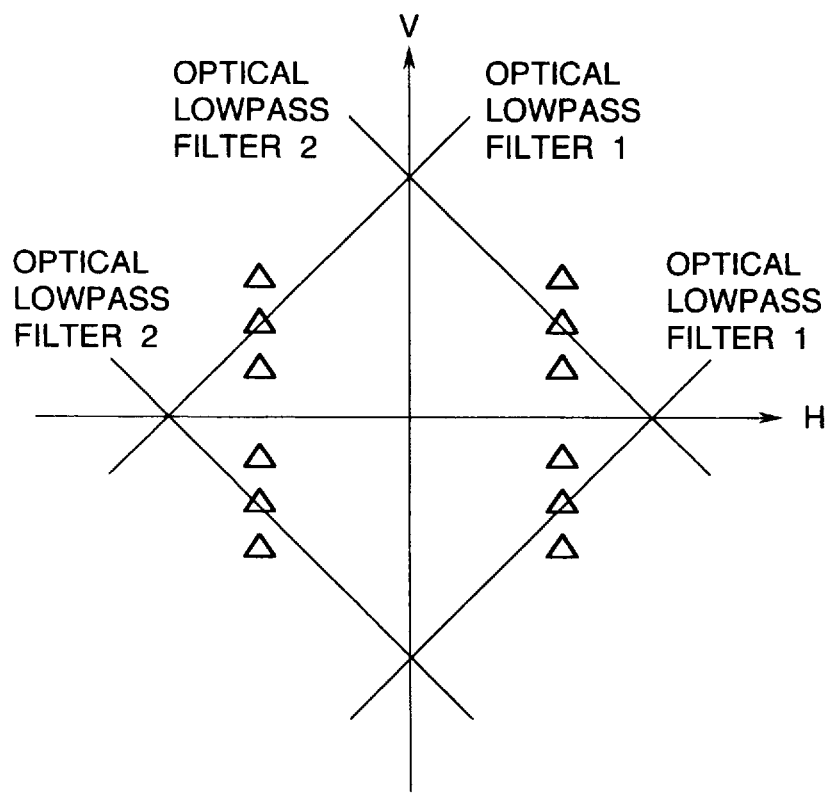
FIG. 5 is a graph showing the operation of optical LPFs.
Figure 6:
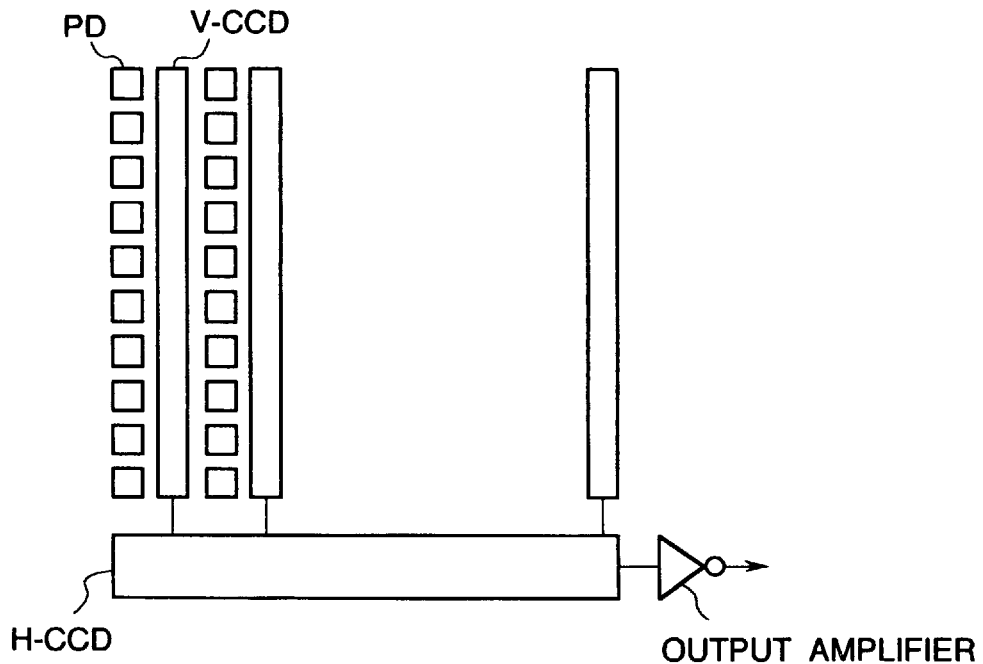
FIG. 6 is a diagram showing the principle of an interline CCD.
Figure 7:
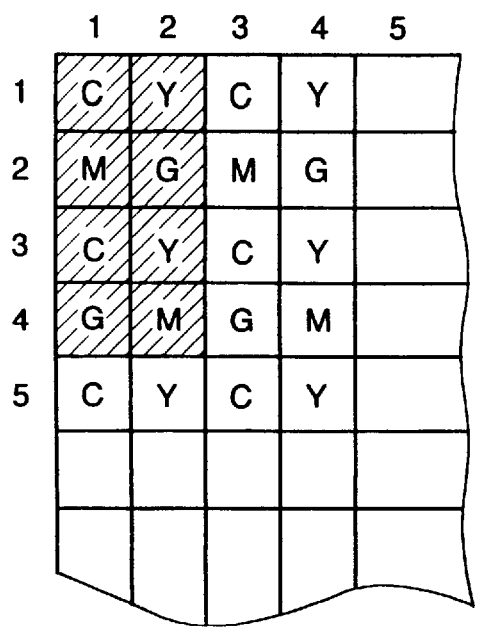
FIG. 7 is a view showing an example of the color layout of a conventional color filter array.
Figure 8A:
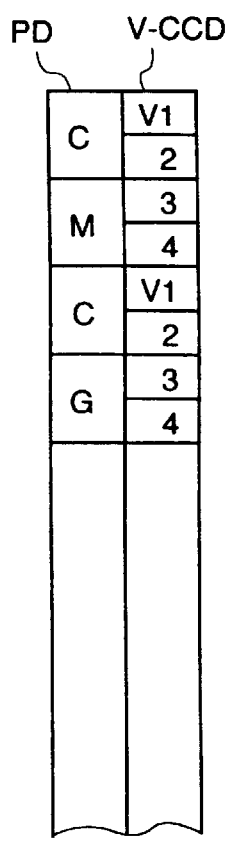
FIGS. 8A to 8C are views showing an example of the transfer operation of pixel signals in a CCD in the example of the color layout shown in FIG. 7.
Figure 8B:
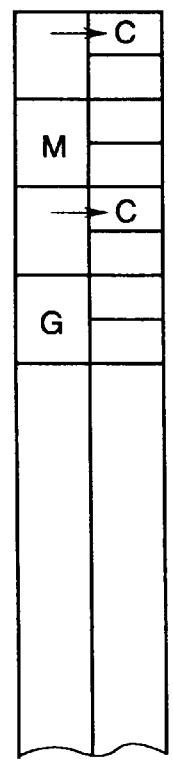
Figure 8C:
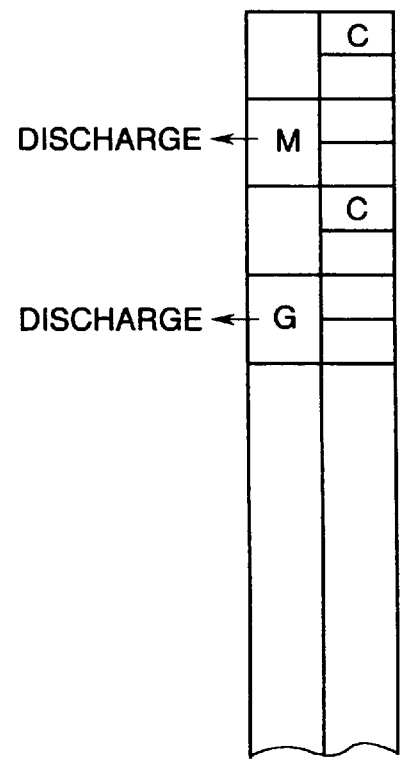

For this reason, using an optical LPF 1 having characteristics for trapping in an oblique direction and an optical LPF 2 having characteristics with a 90°-phase difference from those of the optical LPF 1, as shown in FIG. 5, the number of chrominance signal carriers can be decreased to almost zero. In addition, since the band on the horizontal (vertical) axis is broadened, improvement in resolution, i.e., high image quality can be expected.

A mode in which two pixels are added without thinning will be explained hereinafter. Although different kinds of added chrominance signals, such as C+M, C+G and so on, are output every other line in case of that thinning is performed, as described above (see FIG. 2D), the color difference signals (R−Y, B−Y) can not be formed from the added chrominance signals of all adjacent two lines in case of that the thinning is not performed. Because, when two pixels adjacent in the vertical direction are simply added without thinning, the same added chrominance signals are provided from every adjacent two lines, while the added chrominance signals obtained from respective adjacent two lines are shifted to each other in the horizontal direction by one pixel.

Accordingly, in the present invention, as shown in FIGS. 13A to 13G, accumulated charge (FIG. 13A) is transferred to a V-CCD through a transfer gate (FIG. 13B). Then, potentials of gates V1 and V2 are changed and two charges are added to obtain signals of C1+M1 and Y1+G1 (FIG. 13C). These signal are transferred on the V-CCD together with unadded charges (FIG. 13D).

Next, an operation of transfer of charges to an H-CCD will be explained. Unadded signals G2 and M2 are transferred to the H-CCD (FIG. 13E). Then, the H-CCD is driven to transfer the charge signal to the left direction by one dot (FIG. 13F). Subsequently, the V-CCD is driven again to transfer signals Y2 and C2 to the H-CCD, and added signals M2+Y2 and C2+G10 are resulted in (FIG. 13G). Thereafter, the H-CCD is driven and then the added signal charges are output as a signal train of one horizontal line. Next, the train of the added signals C1+Y1 and Y1+G1 is transferred to the H-CCD, and then the H-CCD is driven to output that train as the signal train of one line without performing an adding processing by horizontal transfer, which is described above. The above-described processing is repeated every two horizontal lines.

As the result, a signal line of different combinations of chrominance signal charges is output every other line, and therefore the color difference signals (R−Y, B−Y) can be formed from adjacent two lines. In this connection, it should be noted that an interlaced signal can be formed by changing the combination of the chrominance signal charges in the next field.

In this embodiment, C, M, Y, and G color filters are used as constituting colors since such combination of filters is effective for sensitivity, and since the combination is the same as that of an existing movie video camera and the signal processing DSP or the like for such camera can be commonly used.

As described above, according to this embodiment, an image pickup apparatus which can attain a high-speed thin-out reading operation and can obtain high image quality can be provided.

In the first embodiment, the present invention is applied to a still video camera. Also, the present invention can be applied to a movie video camera, as a matter of course.

As described above, according to the present invention, an image pickup apparatus which can attain a high-speed thin-out reading operation and can obtain high image quality can be provided.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising a color filter array and a solid-state image pickup element for picking up an image of an object via said color filter array, wherein said color filter array comprises a first horizontal line in which color filters in first and second colors are repetitively arranged in that order in a horizontal direction, a second horizontal line in which color filters in third and fourth colors are repetitively arranged in that order in the horizontal direction, a third horizontal line in which color filters in the second and first colors are repetitively arranged in that order in the horizontal direction, a fourth horizontal line in which color filters in the fourth and third colors are repetitively arranged in that order in the horizontal direction, a fifth horizontal line having the same color filter layout as the first horizontal line, a sixth horizontal line having the same color filter layout as the fourth horizontal line, a seventh horizontal line having the same color filter layout as the third horizontal line, an eighth horizontal line having the same color filter layout as the second horizontal line, and ninth and subsequent horizontal lines that repeat the same color filter layouts as the first to eighth horizontal lines.

2. An apparatus according to claim 1, wherein said solid-state image pickup element comprises an interline CCD in which a vertical CCD is driven in eight phases, and which comprises driving means of said solid-state image pickup element, which element has a mode of transferring photoelectrically converted carriers for two horizontal lines to the vertical CCD every third lines, discharging unnecessary charges by performing a substrate discharge operation, sequentially transferring the photoelectrically converted carriers inside the vertical CCD, and outputting the photoelectrically converted carriers via a horizontal CCD and an output amplifier.

3. An apparatus according to claim 2, wherein the color filter in the first color is a filter for shielding red light, the color filter in the second color is a filter for shielding blue light, the color filter in the third color is a filter for shielding green light, and the color filter in the fourth color is a filter for transmitting the green light.

4. An apparatus according to claim 1, wherein the color filter in the first color is a filter for shielding red light, the color filter in the second color is a filter for shielding blue light, the color filter in the third color is a filter for shielding green light, and the color filter in the fourth color is a filter for transmitting the green light.

5. An image pickup element for picking up an image of an object via a color filter array, wherein said color filter array comprises a first horizontal line in which color filters in first and second colors are repetitively arranged in that order in a horizontal direction, a second horizontal line in which color filters in third and fourth colors are repetitively arranged in that order in the horizontal direction, a third horizontal line in which color filters in the second and first colors are repetitively arranged in that order in the horizontal direction, a fourth horizontal line in which color filters in the fourth and third colors are repetitively arranged in that order in the horizontal direction, a fifth horizontal line having the same color filter layout as the first horizontal line, a sixth horizontal line having the same color filter layout as the fourth horizontal line, a seventh horizontal line having the same color filter layout as the third horizontal line, an eighth horizontal line having the same color filter layout as the second horizontal line, and ninth and subsequent horizontal lines that repeat the same color filter layouts as the first to eighth horizontal lines.

* * * * *

UNITED STATES PATENT AND TRADEMARK OFFICE
CERTIFICATE OF CORRECTION

PATENT NO. : 5,880,781
DATED : March 9, 1999
INVENTOR(S) : YOSHIRO UDAGAWA, ET AL.

Page 1 of 2

It is certified that error appears in the above-identified patent and that said Letters Patent is hereby corrected as shown below:

ON THE TITLE PAGE:

AT [56] REFERENCES CITED

FOREIGN PATENT DOCUMENTS

"07230387" should read --0720387--.

AT [57] ABSTRACT

Line 8, "lines" should read --line--.

COLUMN 2

Line 16, "lines" should read --line--; and
Line 40, "moire" should read --moiré--.

COLUMN 3

Line 25, "lines," should read --line,--.

COLUMN 4

Line 28, "lines" should read --line--; and
Line 29, "lines)." should read --line).--.

COLUMN 5

Line 25, "of that" should be deleted.

UNITED STATES PATENT AND TRADEMARK OFFICE
CERTIFICATE OF CORRECTION

PATENT NO. : 5,880,781
DATED : March 9, 1999
INVENTOR(S) : YOSHIRO UDAGAWA, ET AL.

It is certified that error appears in the above-identified patent and that said Letters Patent is hereby corrected as shown below:

<u>COLUMN 6</u>

Line 50, "lines" should read --line--.

Signed and Sealed this

Twenty-eighth Day of December, 1999

Attest:

Attesting Officer

Q. TODD DICKINSON
Acting Commissioner of Patents and Trademarks